(12) United States Patent
Older et al.

(10) Patent No.: US 9,617,819 B2
(45) Date of Patent: Apr. 11, 2017

(54) SUBSEA COLLET CONNECTION SYSTEM

(71) Applicant: TRENDSETTER ENGINEERING, INC., Houston, TX (US)

(72) Inventors: David Older, Houston, TX (US); Jeffrey Partridge, Houston, TX (US); Brent Cox, Houston, TX (US)

(73) Assignee: TRENDSETTER ENGINEERING, INC., Houston, TX (US)

( * ) Notice: Subject to any disclaimer, the term of this patent is extended or adjusted under 35 U.S.C. 154(b) by 0 days.

(21) Appl. No.: 14/748,799

(22) Filed: Jun. 24, 2015

(65) Prior Publication Data

US 2016/0376863 A1     Dec. 29, 2016

(51) Int. Cl.
*E21B 33/038* (2006.01)
*E21B 43/013* (2006.01)

(52) U.S. Cl.
CPC .......... *E21B 33/038* (2013.01); *E21B 43/013* (2013.01)

(58) Field of Classification Search
CPC ............... Y10S 285/92; Y10S 285/917; Y10S 285/912; E21B 43/0107; E21B 43/013; E21B 33/038; E21B 17/012; E21B 17/015; E21B 17/085; E21B 17/06; E21B 19/004; E21B 19/22; E21B 33/043; E21B 33/068; E21B 41/04; F16L 37/002; F16L 37/06
See application file for complete search history.

(56) References Cited

U.S. PATENT DOCUMENTS

| | | | |
|---|---|---|---|
| 3,523,579 A | 8/1970 | Nelson | |
| 4,411,455 A * | 10/1983 | Schnatzmeyer | F16L 37/084 166/237 |
| 4,477,105 A * | 10/1984 | Wittman | F16L 27/04 285/18 |
| 4,693,497 A | 9/1987 | Pettus et al. | |
| 4,708,376 A | 11/1987 | Jennings et al. | |
| 5,771,927 A * | 6/1998 | Johansen | E21B 33/038 137/614 |
| 5,795,093 A | 8/1998 | Seaton et al. | |
| 6,267,419 B1 | 7/2001 | Baker et al. | |
| 9,255,453 B1 * | 2/2016 | Jennings | E21B 17/085 |

(Continued)

FOREIGN PATENT DOCUMENTS

GB        2467192 B        7/2010

OTHER PUBLICATIONS

International Search Report for corresponding International Application No. PCT/US16/39320.

Primary Examiner — James G Sayre
(74) Attorney, Agent, or Firm — Egbert Law Offices, PLLC (57) ABSTRACT

A subsea connection system for connecting to a hub has a body with an interior passageway suitable for allowing fluids to flow therethrough, a collet having a plurality of collet segments that are movable between a locked position and an unlocked position, an outer sleeve overlying the collet, and a translator cooperative at the outer sleeve so as to move the outer sleeve between a first position and a second position. The plurality of collet segments are in the unlocked position when the outer sleeve is in the first position. The plurality of collet segments are in the locked position when the outer sleeve is in the second position. The locked position is adapted to secure the body in connection with the hub.

16 Claims, 5 Drawing Sheets

(56) References Cited

U.S. PATENT DOCUMENTS

| | | |
|---|---|---|
| 2001/0028150 A1 | 10/2001 | Fant |
| 2010/0078174 A1 | 4/2010 | Spiering et al. |
| 2010/0288503 A1 | 11/2010 | Cuiper et al. |
| 2012/0318516 A1 | 12/2012 | Beynet et al. |
| 2014/0361534 A1* | 12/2014 | Bekkevold ............ E21B 43/013 285/315 |
| 2015/0114659 A1* | 4/2015 | Jahnke .................. E21B 33/038 166/360 |

* cited by examiner

SUBSEA COLLET CONNECTION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the connecting of external items to a subsea structure. More particularly, the present invention relates to collet-type connection systems. More particularly the present invention relates to a vertical connector that is able to connect hubs together.

2. Description of Related Art Including Information Disclosed Under 37 CFR 1.97 and 37 CFR 1.98.

Technology advances related to subsea petroleum exploration have resulted in the development of various conduit and wellhead connector mechanisms which may be remotely controlled for the purpose of achieving connection between mechanical and hydraulic apparatus of wellheads, conduits, and the like. A popular type of connector assembly is a hydraulically-actuated collet connector which utilizes a series of segment clamps which are biased by other mechanical apparatus to releasably secure a pair of abutting flanges into a sealed assembly. Collet connectors and other acceptable connector mechanisms are generally utilized for connection of the wellhead valve system with the production system of the wellhead so that the wellhead valve assembly may be disconnected and removed in the event that replacement or repair is necessary.

A multi-well subsea assembly can include subsea structures such a subsea trees, manifolds, and/or pipeline end terminations. These subsea structures can be interconnected by jumpers. The jumpers mate up with the subsea structures using connectors that mate with hubs on the subsea structures. Production is often routed from the trees in the gathering manifolds and from the gathering manifolds to pipeline end terminations and pipelines to the platform.

When dealing with subsea applications, it becomes necessary to simplify or eliminate the use of divers during the locking of a connector in order to secure the connection between the drilling or piping components in the wellhead. Hydraulically-actuated collet connectors have been developed and utilized for this purpose. These collet-type connectors are designed for high pressure in deepwater drilling operations. The collet connectors are secured over the mating sections of the drilling or piping components to be connected by use of hydraulic pressure. Because the hydraulic pressure can be controlled remotely, it is not necessary for divers to lock the collet connector in order to secure the connection.

There are several problems associated with existing collet connectors. First, and foremost, very skillful operators are required so as to bring the hub of a collet connector into a proper position with respect to the hub of the subsea structure. In certain circumstances, it is been known that the hubs can become damaged if the landing between the hubs is not carried out properly. Additionally, there is a possibility that the gasket between the hubs can become compromised if an improper engagement between the hubs is carried out. Additionally, in prior art collet connectors, the lead screw associated with the collet connectors is placed into the primary load path of the connection. As a result, additional force is required in order to achieve the proper connection. In prior art collet connector systems, it becomes difficult for the operators to properly view the connection while it is being carried out. Furthermore, prior art collet connector systems also have ineffective secondary removal capabilities. As such, a need has developed in association with collet connectors so as to allow the collet connector to be easily and properly installed with no possibility of damaging contact during the installation.

In order to allow for the proper connection and disconnection of hubs in the subsea environment, it is necessary to properly join such hubs in the subsea environment. Once the hubs are joined, then a liquid, chemical, or other fluid, can flow through the connector so as to be delivered to the tubing that is connected to the hubs or to a structure that is connected to one of the hubs. Under certain circumstances, it is desirable to release the connection of the hubs in the subsea environment. Unfortunately, when such hubs are disconnected, there will be a release of residual fluid into the subsea environment. This can produce environmental consequences. As such, a need has developed so as to be able to effectively close the interior passageways of the connected hubs upon the release of one hub from the other.

Subsea connectors are known that can be suitably connected through the use of a remotely-operated vehicle (ROV). Typically, the ROV will travel to the subsea structure, manipulate the hubs, and then apply a torque tool to the actuator of one of the connectors so as to achieve this connection. However, it would be desirable to avoid the need to use the ROV so as to achieve the proper connection. Importantly, it would be desirable to be able to send remote signals so as to carry out the necessary operations whereby the connector can be properly used and manipulated so as to connect the hubs.

In the past, various patents and patent application publications have issued with respect to collet-type connectors. For example, U.S. Pat. No. 3,523,579, issued on Aug. 11, 1970 to N. A. Nelson, describes a wellhead valve assembly which includes a plurality of hydraulically-actuated valves and an appropriate hydraulic fluid supply system for actuation of the valves. A hydraulically-actuated collet connector is provided for connecting production flow conduits and hydraulic fluid supply conduits to the wellhead valve assembly. The collet connector includes a means for remotely detecting leakage of production fluid or hydraulic fluid in the event that the joint between the wellhead valve assembly and the hydraulic collet connector should fail to properly seal.

U.S. Pat. No. 4,477,105, issued on Oct. 16, 1984 to Wittman et al., teaches a collet-actuated ball-and-socket connector. This connector is for connecting the ends of two pipes. A ball coupling member is adapted for connection to the end of one of the pipes. A retaining flange is freely disposed about the ball coupling member and engages the outer surface of the member. A socket coupling member is adapted for connection to the end of the other of the two pipes and provided for accepting the ball coupling member so as to provide a metal sealing ring for mating with the ball members. A collet locking means is mounted about the outer periphery of the socket coupling member and extends generally axially therefrom for permitting insertion of the ball coupling member in mating engagement with the socket coupling member when the collet means is open. An actuating means applies a predetermined axial force to the collet locking means for closing the collet means to engage the retaining flange and lock the ball-and-socket coupling members together in a sealed rigid relationship.

U.S. Pat. No. 4,693,497, issued on Sep. 15, 1987 to Pettus et al., describes a remotely-actuated collet connector which is suitable for joining tubular members with similar or different end preparations or profiles. The collet connector includes a housing to support the connector from a first tubular member, a plurality of collet fingers or segments mounted within the housing and around the exterior of the first tubular member, and an actuator ring surrounding the fingers to move the fingers to a release or latch position, and a pressure responsive means for moving the actuator ring. Each of the collet fingers has a first engaging surface and an adapter secured to the finger and also has a second engaging surface. The first engaging surface mates with the end profile of the first tubular member. The second engaging surface mates with the end profile of the second tubular member so that when the collet fingers are moved to the latch position they secure the first and second tubular members together.

U.S. Pat. No. 4,708,376, issued on Nov. 24, 1987 to Jennings et al., shows a collet-type connector having an upper body member having a plurality of collet segments, a cam ring movable relative to the upper body member to move the collet segments into a detachable connection with the connector of a subsea wellhead. The cam ring and the collet segments have sets of camming surfaces whereby a first set is cooperative to pivot the collet segments initially toward the wellhead and whereby a second set serves to urge the collet segments further to clamp the connector to the subsea wellhead. When the second set of camming surfaces function, the first set no longer functions to rotate the collet segments so as to reduce the power requirements for urging the collet segments into clamping engagement.

U.S. Pat. No. 6,267,419, issued on Jul. 31, 2001 to Baker et al., shows a remotely actuated clamping connector. The clamping connector includes clamp halves linked by a locking stem. The locking stem is forced into a pre-stressed state by moving the locking stem from a first relaxed position to a second pre-stressed position and retained in the second pre-stressed position by a locking collet. A locking collet through which the locking stem extends is moved from a first unlocked position to a second locked position wedged between the locking stem and one or the other of the clamp halves. When the locking collet is in the second locked position, it resists movement of the locking stem from the second pre-stressed position to the first relaxed position. The locking collet is then locked in the second locked position.

U.S. Patent Application Publication No. 2014/0361534, published on Dec. 11, 2014 to K. Bekkevold, describes a connector having a plurality of latching fingers arranged around a cylindrical body and having a central axis. Each finger has a first end region extending beyond an end of the body includes a first latching structure. Each finger is pivotally supported at an intermediate region by a portion of the body and is movable between a non-latching position and a latching position in which the first end region is closer to the central axis than in the non-latching position. The connector includes a first actuated member arranged in contact with a plurality of fingers and operable to move the fingers between the non-latching position and the latching position. An actuator is operable to force a second end region of each finger toward the body. The connector can be connected to a hub by bringing the connector face into contact with a hub face, moving the latching fingers toward the connector until the first latching structures are engaged in corresponding second latching structures on the hub, and then holding the latching structures together in a latching engagement.

It is an object of the present invention to provide a collet connection system that effectively prevents damage to the hubs and damage to the gasket that is arranged between the hubs.

It is another object the present invention provide a collet connection system that improves installation efficiency.

It is another object the present invention to provide a collet connection system that allows less skillful operators to carry out the connection.

It is another object of the present invention to provide a collet connection system that facilitates the ability to release the connection between the hubs.

It is another object of the present invention to provide a collet connection system that can effectively operate as a vertical connector in a subsea environment.

It is another object of the present invention to provide a collet connection system which facilitates the ability to connect coiled tubing to a subsea structure or to a subsea fluid line.

It is another object of the present invention to provide a collet connection system which facilitates the ability to release the hubs in the event of an emergency condition.

It is still another object of the present invention to provide a collet connection system which avoids the need for torque tools of an ROV or for the use of a ROV to establish the hub-to-hub connection.

These and other objects and advantages of the present invention will become apparent from a reading of the attached specification and appended claims.

BRIEF SUMMARY OF THE INVENTION

The present invention is a subsea connection system for connecting to a hub. The subsea connection system includes a body having an interior passageway adapted to allow a fluid to flow therethrough, a collet having a plurality of collet segments that are movable between a locked position and an unlocked position, and outer sleeve overlying the collet, and a translator cooperative with the outer sleeve so as to move the outer sleeve between a first position and a second position. The plurality of collet segments are in the unlocked position when the outer sleeve is in the first position. The plurality of collet segments are in the locked position when the outer sleeve is in the second position. The locked position is adapted to secure the body to the hub. The plurality of collet segments are positioned adjacent to an end of the body.

The outer sleeve has a surface on the inner wall thereof that bears against an outer surface of the plurality of collet segments as the outer sleeve moves between the first position and the second position. The surface on the inner wall of the outer sleeve has a first tapered region that bears against the outer surface of the plurality of collet segments when the outer sleeve is in the first position and the plurality of collet segments are in the unlocked position. The surface on the inner wall of the outer sleeve has a second tapered region that bears against the outer surface of the plurality of collet segments when the outer sleeve is in the second position and the plurality of collet segments are in the locked position. Each of the plurality of collet segments has a first end and a second end. The first tapered region bears against the first end of the plurality of collet segments when the plurality of collet segments are in the unlocked position. The second tapered region bears against the second end of the plurality of collet segments when the plurality of collet segments are in the locked position. The plurality of collet segments have an end that extends outwardly beyond an end of the body. Each of the plurality of collet segments has an inner shoulder at the end of the plurality of collet segments. This inner shoulder is adapted to bear against the hub. The inner shoulder at the end of the plurality of collet segments is tapered so as to draw the hub toward an end of the body. The plurality of collet segments are pivotally mounted relative to the body.

The translator includes a first hydraulic conduit formed through a wall of the sleeve. The first hydraulic conduit opens to the interior of the sleeve and to the exterior of the body. The translator includes a shoulder formed on the exterior of the body and a flange formed inwardly of the inner wall of the sleeve. The first hydraulic conduit opens to the inner wall of the sleeve and is spaced between the shoulder of the body and the flange of the sleeve. A pump is connected to the first hydraulic conduit so as to introduce hydraulic fluid under pressure into the space so as to move the outer sleeve between the first position and the second position. A second hydraulic conduit is formed through the wall of the sleeve in spaced relation to the first hydraulic conduit. An annular fluid-receiving space is formed in the interior of the sleeve on opposite side of the flange from the shoulder. The pump is adapted to introduce hydraulic fluid into the annular fluid-receiving space so as to move the sleeve from the second position to the first position.

A first poppet is positioned in the interior passageway of the body adjacent to an end of the body. The first poppet is movable between an open position suitable for allowing the fluid flow through the end of the body and a closed position suitable for blocking the fluid from flowing through the end of the body.

The present invention is also a vertical subsea connection system that comprises a body having an interior passageway adapted to allow a fluid to flow therethrough, a collet having a plurality of collet segments in which the plurality of collet segments are movable between a locked position and an unlocked position, an outer sleeve overlying the collet, a translator cooperative with the outer sleeve so as to move the outer sleeve between a first position and a second position, and a hub positioned adjacent the end of the body. The plurality of collet segments are in the unlocked position when the sleeve is in the first position. The plurality of collet segments are in the locked position when the outer sleeve is in the second position. The plurality of collet segments lock an end of the hub against the end of the body when the sleeve is in the second position and the plurality of collet segments are in the locked position. The hub has a flow passageway extending therethrough.

A first poppet is positioned in the interior passageway of the body adjacent to the end of the body. The first poppet is movable between an open position suitable for allowing fluid flow through the end of the body and a closed position suitable for blocking the fluid from flowing through the end of the body. A second poppet is positioned in the flow passageway adjacent an end of the hub. The second poppet is movable between an open position suitable for allowing fluid to flow through the end of the hub and a closed position suitable for blocking fluid from flowing through the end of the hub. The first poppet has an end bearing against an end of the second poppet when the hub is locked by said plurality of collet segments to the body so as to maintain the first poppet in the open position and the second poppet in the open position. The first poppet is in the closed position and the second poppet is in the closed position when the sleeve is in the first position in the plurality of collet segments are in the unlocked position.

The outer sleeve has a surface on an inner wall thereof that bears against an outer surface of the plurality of collet segments as the outer sleeve moves between the first position and the second position. The surface on the inner wall of the outer sleeve has a first tapered region that bears against the outer surface of the plurality of collet segments when the outer sleeve is in the first position in the plurality of collet segments are in the unlocked position. The surface on the inner wall of the outer sleeve has a second tapered region that bears against the outer surface of the plurality of collet segments when the outer sleeve is in the second position and the plurality of collet segments are in the locked position.

The translator includes a first hydraulic conduit formed through a wall of the sleeve so as to open to the interior of the sleeve and to the exterior of the body, a shoulder formed on the exterior of the body, a flange formed inwardly of the inner wall of the sleeve, and a pump connected to the first hydraulic conduit so as to introduce hydraulic fluid under pressure into the space so as to move the outer sleeve between the first position and the second position. The first hydraulic conduit opens at the inner wall of the sleeve into the space between the shoulder of the body and the flange of the sleeve.

The foregoing Section is intended describe, with particularity, the preferred embodiment of the present invention. It is understood that modifications to this preferred embodiment can be made within the scope of the present claims without departing from the true spirit of the invention. As such, the Section should not be construed, in any way, as limiting of the broad scope of the present invention. The present invention should only be limited by the following claims and their legal equivalents.

DETAILED DESCRIPTION OF THE INVENTION

Figure 1:
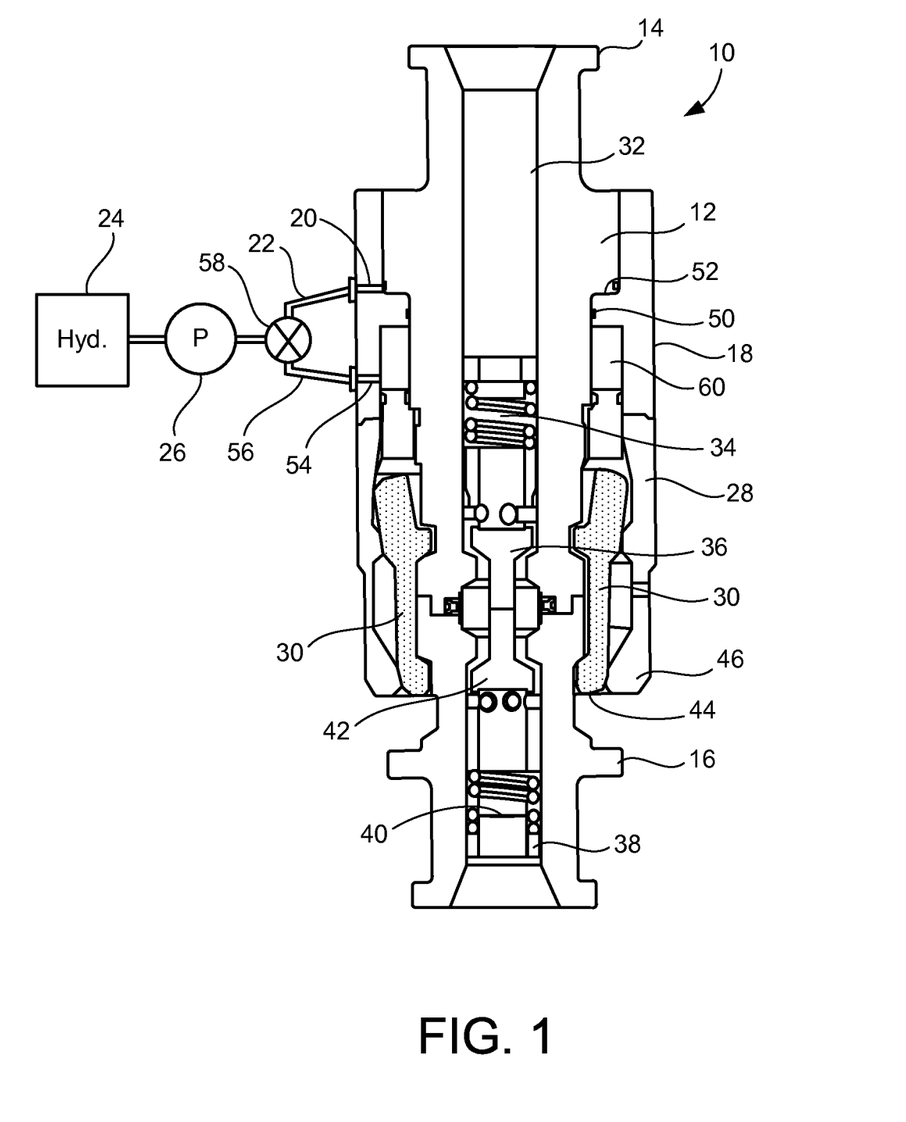
FIG. 1 is a side cross-sectional view of the subsea collet connection system of the present invention showing the connection system in a locked position.

Referring to FIG. 1, there is shown the subsea collet connection system 10 in accordance with the teachings of the preferred embodiment of the present invention. The subsea collet connection system includes a body 12 having a hub 14 at one end thereof. The hub 14 is suitable for connection to exterior piping, such as coiled tubing or to a disconnect mechanism. The subsea collet connection system 10 is used so as to connect with an outboard hub 16. The subsea collet connection system 10 has an outer sleeve 18 that is slidably and controllably positioned over the exterior of the body 12. The sleeve 18 includes a channel 20 that is formed through a wall thereof. Channel 20 can be connected to a conduit 22 that is ultimately connected to a source of hydraulic fluid 24. A pump 26 is provided so as to pass the hydraulic fluid from the source 24 through the conduit 22 and into the space between the body 12 and the inner surface of the sleeve 18. In order to allow for the sliding action of the outer sleeve 18 relative to the body 12, hydraulic fluid is introduced through conduit 22 and through the channel 20 so as to cause the outer sleeve 18 to move from the position shown in FIG. 1 to the position shown in FIGS. 3 and 4.

A lock ring 28 is in abutment with the end of the outer sleeve 18. Within the concept of the present invention, the outer sleeve 18 and the lock ring 28 can be integrally formed together. For the purposes of the present invention, the lock ring 28 is interpreted as a portion of the outer sleeve 18. When the sleeve 18 moves in relation to the body 12, the lock ring 28 will also move. There are a plurality of collet segments 30 that are positioned within the interior of the lock ring 28. Each of the collet segments 30 has an outer surface with a particular shape which can cause the actions of locking and releasing created by the subsea collet connection system 10 in accordance with the present invention. The lock ring 30 has an interior shape which bears against the outer surface of the collet segments 30 so as to facilitate the movement of the collet segments 30 between the locked position and unlocked position. FIG. 1 illustrates the plurality of collet segments 30 has being in the locked position. In this locked position, the hub 16 is engaged with the end of the body 12.

The connector body 12 includes in interior bore 32. A spring 34 is resiliently mounted in the interior bore 32 of the body 12. A poppet 36 is located within the interior bore 32 of the body 12 and has a surface which can bear against an inner wall of the body 12. The hub 16 has an interior passageway 38 that has a spring 40 mounted therein. Spring 40 is configured so as to bear against the poppet 42. Poppet 42 has a surface that is designed to seal in relation to a shoulder formed on the wall of the interior passageway 38 of the hub 16.

FIG. 1 shows the subsea collet connection system 10 in the locked position. As can be seen, the end 44 of the collet segments 30 has an interior shoulder that bears against an exterior shoulder at the end of the hub 16. This locked configuration is accomplished by the bearing end 46 of the lock ring 28 strongly urging against the exterior of the end portion of the collet segments 30. The sleeve 18 will be in its uppermost position such that a flange 50 extending inwardly of the sleeve 18 will bear against a shoulder 52 formed on the body 12. In this position, the end of the poppet 36 is illustrated as bearing against the end of the poppet 42. This will resiliently urge the shoulders of the poppets 36 and 42 away from their seated position. As result, fluid is able to flow through the interior bore 32 of the body 12 enter the interior passageway 38 of the hub 16, or vice versa.

In FIG. 1, it can be seen that there is another conduit 54 that extends through the wall of the sleeve 18. Another channel 54 is formed through the wall of the sleeve 18 so as to open to the interior of the sleeve 18 and to the exterior of the body 12. A conduit 56 is connected the channel 54 and is ultimately connected to the pump 26 and the hydraulic fluid supply 24. So as to allow for the movement of the sleeve 18 between a first position and a second position, a valve 58 is cooperative with the pump 26 and the hydraulic fluid supply 24. Valve 58 can be suitably adapted so as to be actuated so as to deliver hydraulic fluid, under pressure, from the hydraulic fluid supply 24 through the conduit 22 and into the channel 20. Alternatively, the valve 58 can be adapted so as to cause the hydraulic fluid from the hydraulic fluid supply 24 to pass under pressure through the conduit 56 and into the channel 54. This allows the sleeve to move between the second position (locking the collet segments 30 upon the hub 16) and the first position in which the collet segments 30 are unlocked from the hub 16 so as to allow the hub 16 to be properly released.

FIG. 1 illustrates the sleeve 18 in its second position which locks the collet segments 30. As such, fluid is introduced under pressure through the channel 54 so as to fill and annular space 60 on a side of the flange 50 from the shoulder 52. Flange 50 and the sleeve 18 will move toward the shoulder 52 of the body 12. As a result, the bearing end 46 of the sleeve 18 will strongly bear against the exterior of the collet segments 30 so as to lock the collet segments 30 upon the shoulder of the hub 16. As a result, fluid communication is established between the interior bore 32 of the body 12 and the interior passageway 38 of the hub 16. Since the ends of the poppets 36 and 42 bear against each other, they are properly offset from their seated position so as to allow fluid flow therethrough. As used herein, the hydraulic fluid supply 24, in combination with the pump 26, along with channels 20 and 54, serves as the "translator" of the present invention. Within the concept of the present invention, various other techniques for causing the translatable movement of the sleeve 18 relative to the body 12 can also be established. In particular, suitable actuating mechanisms can also create such a movement. Additionally, an ROV torque tool can also be used, along with suitable actuating mechanisms, so as to cause this movement. The "translator" as shown in FIG. 1 is simply one form of creating the requisite movement of the sleeve 18 with respect to the body 12.

Figure 2:
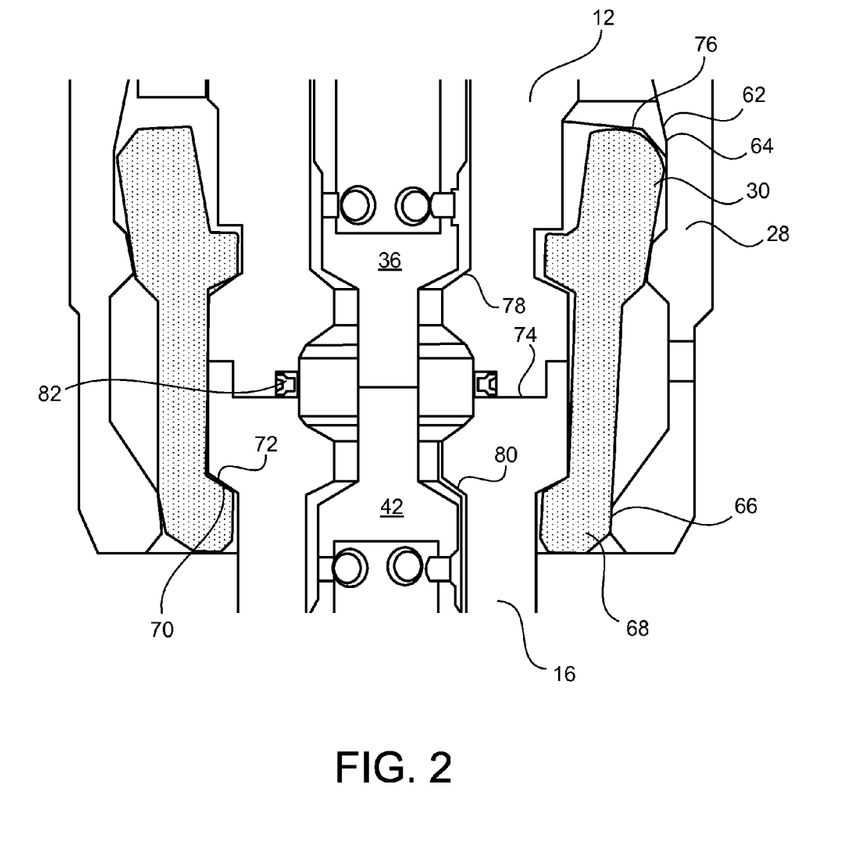
FIG. 2 is a cross-section detailed view showing the relationship between the collet segments, the sleeve and the hub of the subsea collet connection system of the present invention.

FIG. 2 shows the particular relationship between the collet segment 30, the lock ring 28 of the sleeve 18, the end of the body 12 and the end of the hub 16. In particular, it can be seen that the lock ring 28 of sleeve 18 has an inner surface that bears against the outer surface of the collet segments 30 as the sleeve 18 moves between the first position and the second position. The inner wall 62 of the lock ring 28 includes a first tapered region 64 and a second tapered region 66. The second tapered region 66 bears against the outer surface at the end 68 of the collet segment 30 when the outer sleeve 18 is in the second position and the plurality of collet segments 30 are in the locked position. The end 68 of the plurality of collet segments includes an inner shoulder 70 that is suitably tapered. Similarly, the hub 16 includes a tapered shoulder 72 adjacent an end thereof. As the second tapered region 66 on the inner surface 62 of the lock ring 28 bears against the end 68 of the plurality of collet segments 30, the inner shoulder 70 will slide along the tapered surface 72 of the hub 16 so as to draw the end of the hub 16 into tight engagement against the end 74 of the body 12. The first tapered region 64 on the inner surface 62 of the lock ring 28 is released from contact with the end 76 of the collet segments 30. As a result, the collet segments 30 are able to pivot relative to the body 12.

In the position shown in FIG. 2, it can be seen that the first poppet 36 has an end that is in abutment with the second poppet 42. As a result, the shoulder of the first poppet 36 is spaced from the inner wall of the shoulder 78 of body 12 so as to cause a flow path therein. The force of abutment between the first poppet 36 and the second poppet 42 will overcome the resistance created by the spring 34. Similarly, the second poppet 42 is spaced from the shoulder 80 in the interior passageway 38 of the hub 16 so as to allow a flow path therein. The force of abutment overcomes the resistance caused by the spring 40 in the interior passageway 38 of the hub 16. In the configuration shown in FIG. 2, the end of the hub 16 is in tight abutment with the end 74 of the body 12 so as to be in a tight sealing relationship therewith. A seal 82 can be positioned at the end 74 of the body 12 so as to further facilitate the tight sealing relationship between the end of the hub 16 and the end of the body 12. Since the poppets 36 and 42 are separated from their seated position, a fluid flow connection is established between the hub 16 and the interior bore 32 of the body 12.

Figure 3:
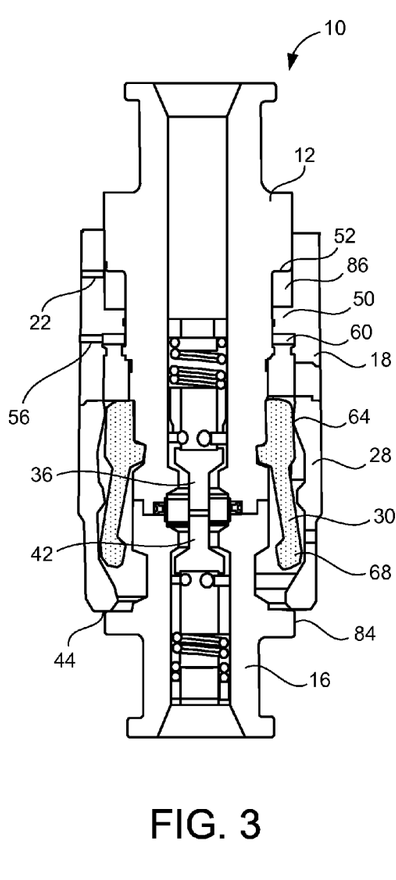
FIG. 3 is a cross-sectional view of the subsea collet connection system of the present invention in an unlocked position.

FIG. 3 shows the subsea collet connection system 10 of the present invention in its unlocked position. As can be seen, hydraulic fluid has been introduced into the channel 22 so as to urge the flange 50 away from the shoulder 52 of the body 12. This causes the sleeve 18 to move downwardly so as to also cause the lock ring 28 to move downwardly. As result, the inner surface of the lock ring 28 will bear against the first tapered region 64 of the collet segments 30 such that the end portion 68 of the collet segments 30 releases from the shoulder 72 at the end of the hub 16. As a result, the collet segments 30 will no longer grasp the hub 16. As will be described hereinafter, the first tapered region 64 on the inner surface of the lock ring 28 has a particular shape that bears against the outer surface of the collet 30 so as to pivot the collet segment 30 outwardly.

In this unlock unlocked position, as shown in FIG. 3, the first poppet 36 will bear against the second poppet 42. In this configuration, the end of the hub 16 still bears against the end of the body 12. The hub 16 has not yet been released from the body 12. Also, the flange 84 of the hub 16 will still bear against the end 44 of body 12.

The "translator" of the present invention allows the hydraulic fluids to be introduced under pressure into the space 86 between the flange 50 of the outer sleeve 18 and the shoulder 52 of the body 12. The fluid in the annular receiving space 60 will exit from that space through the channel 56. The piston that results from the relationship between the flange 50 and the body 12 will allow the sleeve 18, along with the lock ring 28, to move between a second position (as shown in FIGS. 1 and 2) to a first position in which the collet segments 30 are effectively released from engagement with the hub 16. This allows the hub 16 to be released from the body 12.

Figure 4:
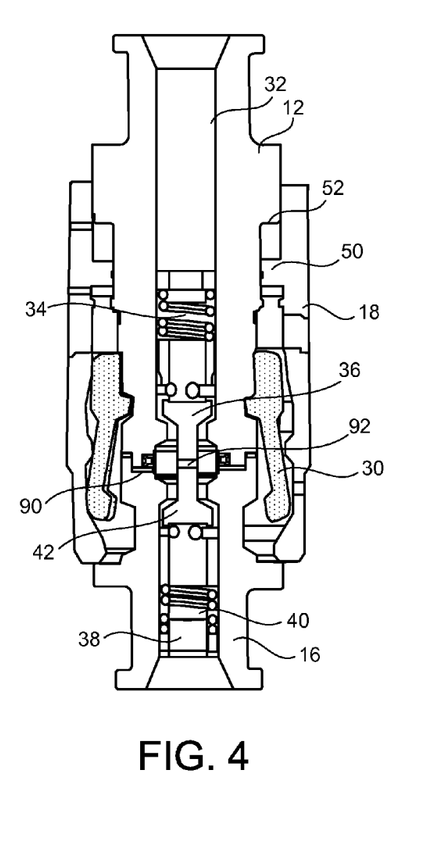
FIG. 4 is a cross-sectional view of the subsea collet connection system of the present invention in a released position.

In FIG. 4, it can be seen that the flange 50 of the sleeve 18 has moved further away from the shoulder 52 of the body 12. This causes the collet segments 30 to further urge the hub 16 away from the end of the body 16. There is a separation space 90 that occurs between the end of the body 12 and the end of the hub 16. This is the release position. Also, as can be seen, there is a small space 92 formed between the ends of the poppets 36 and 42. Since there is a space 92, the spring 34 will urge the poppet 36 into strong abutment with the inner wall of the interior bore 32 of the body 12. As a result, the interior of the body 12 is sealed by the poppet 36. Similarly, the spring 40 in the hub 16 will urge the second poppet 42 against the shoulder on the inner wall of the interior passageway 38 of the hub 16. As a result, the interiors of the body 12 and the hub 16 are sealed. When the subsea collet connection system 10 of the present invention is released from the hub 16, the poppets 36 and 42 will prevent spillage or leakage of fluid into the subsea environment.

Figure 5:
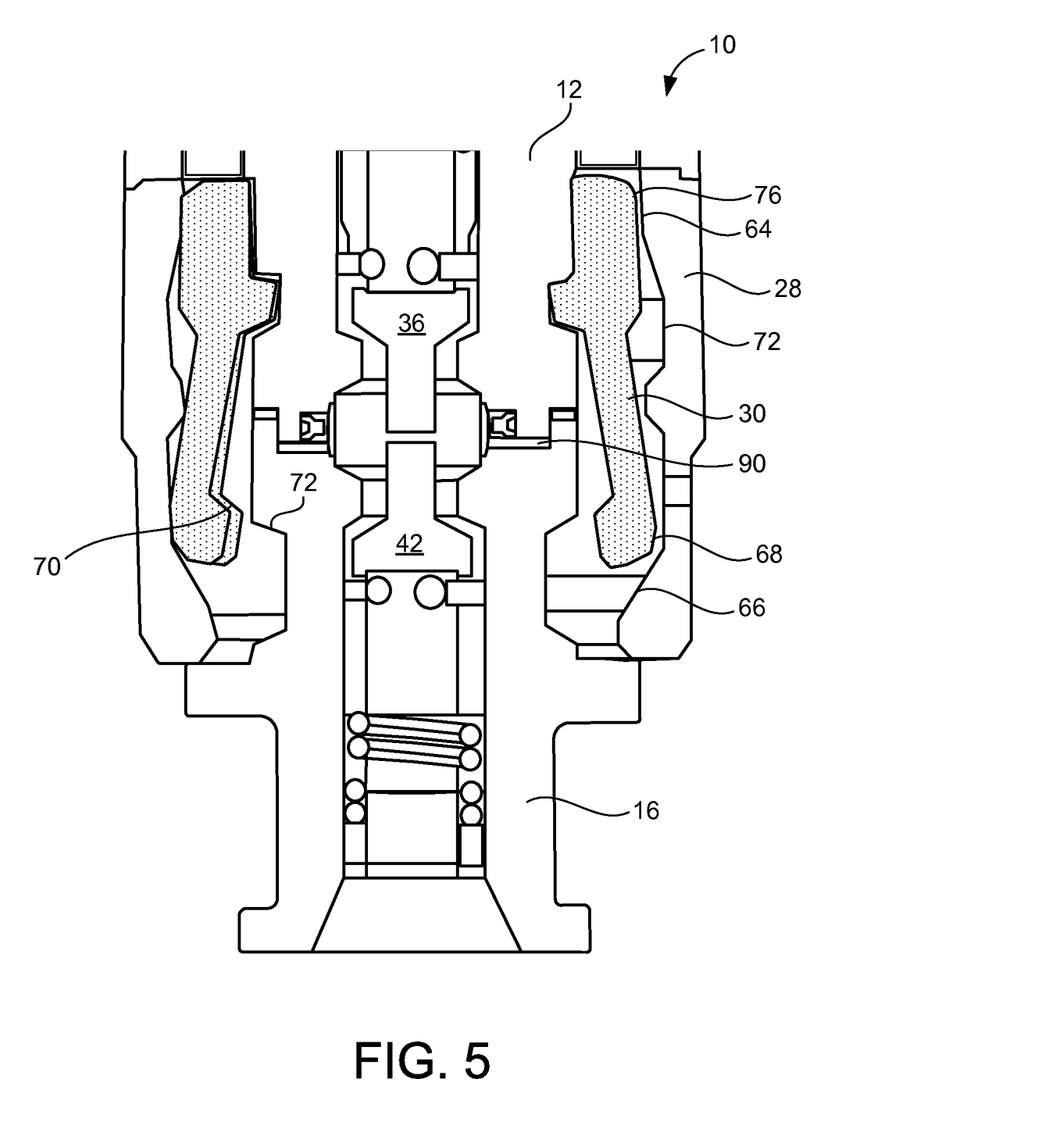
FIG. 5 is a detailed view showing the relationship between the collet segments, the sleeve and the hub when in the released position.

FIG. 5 specifically shows this releasing action. Importantly, the first tapered region 64 on the inner wall of the lock ring 28 will bear against the end 76 of the collet segment 30. As a result, the end 76 of the collet segment 30 is forced against the outer surface of the body 12. This causes the collet segment 30 to pivot outwardly such that the inner shoulder 70 is released from the shoulder 72 of the hub 16. In FIG. 5, the collet segments 30 of the subsea collet connection system 10 are in their release position. As a result, there will be a space 90 that results between the end of the body 12 and the end of the hub 16. The first poppet 36 and the second poppet 42 are illustrated in a position sealing against the respective shoulders of the body 12 and the hub 16. The second tapered region 66 of the lock ring 28 is illustrated in its lowermost position. This shows clear separation between the second tapered region 66 and the end surface 68 of the collet segment 30. This particular configuration of the inner surface 72 of the lock ring 28 is unique in that the structural pattern of tapered surfaces formed on the inner surface 72 achieves both the locking of the collet segments 30 upon the hub 16 and also achieves the release of the collet segments 30 from the hub 16 merely by the sliding motion of the sleeve 18 and/or the lock ring 28. During this motion, the poppets 36 and 42 are particularly configured so as to effectively create a sealed condition whenever the collet segments 30 are in this position whereby they are released from the hub 16.

Figure 6:
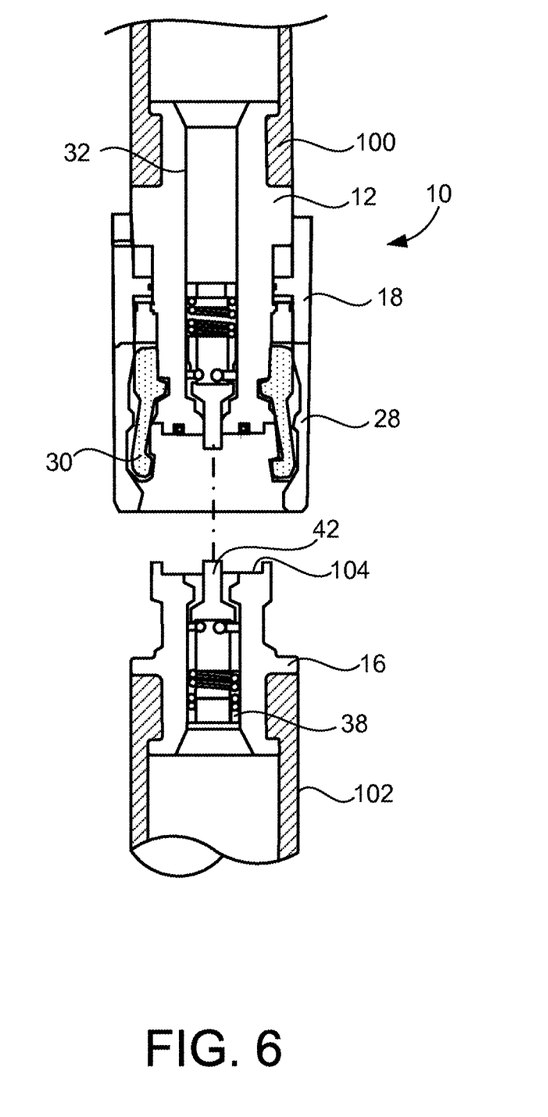
FIG. 6 is a cross-sectional view showing the hub as released from the connector of the subsea collet connection system of the present invention.

FIG. 6 shows the subsea collet connection system 10 as released from the hub 16. In FIG. 6, there is a coiled tubing 100 that is affixed to the end of the body 12. As a result, the coiled tubing 100 can establish fluid communication with the interior bore 32 of the body 12. As a result, chemicals or fluids can be delivered from a surface location into the bore 32 or transmitted from a subsea location through the bore 32 and into the coiled tubing 100.

FIG. 6 illustrates the hub 16 as having a hose 102 connected thereto. The hub 16 will have an end 104 that extends outwardly beyond the hose 102. The interior passageway 38 of the hub 16 can be used so as to allow fluids to pass from the interior bore 32 the body 12, through the hub 16 and into the hose 102. Alternatively, fluids can pass from the hose 102 up through the interior passageway 38 of the hub 16, through the interior bore 32 of the body 12 and into the coiled tubing 100.

The sleeve 18 and the lock ring 28 are illustrated in the first or release position. As a result, the collet segments 30 have been released from the hub 16. In this configuration, the poppet 36 is sealed against the inner wall of the interior bore 32 of body 12. The poppet 42 is sealed against the inner wall of the interior passageway 38 of the hub 16. The weight associated with the hub 16, along with the hose 102, causes the hub 16 to separate, by action of gravity, from the interior of the lock ring 28. The poppet 36 is in sealed relationship with the interior bore of the body 12 so as to prevent any liquid within the body 12 or within the coiled tubing 100 from being released into the marine environment. Similarly, it can be seen that the poppet 42 is in sealed relationship with the inner wall of the interior passageway of the hub 16. Once again, the serves to prevent any release of contaminants or fluids from the interior of the hose 102 or from the interior of the hub 16 into the marine environment.

In order to install the hub 16 into the subsea collet connection system 10, it is only necessary to reverse the steps illustrated in FIGS. 1-5 herein. In this manner, the subsea collet connection system 10 can easily engage with the hub 16 in order to create the requisite sealed fluid-tight relationship therebetween.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A subsea connection system for connecting to a hub, the subsea connection system comprising:
   a body having an interior passageway, said interior passageway adapted to allow a fluid to flow therethrough;
   a collet having a plurality of collet segments, said plurality of collet segments movable between a locked position and an unlocked position, said plurality of collet segments positioned adjacent to an end of said body;
   an outer sleeve overlying said collet, said outer sleeve having an inner wall and an interior; and
   a translator cooperative with said outer sleeve so as to move said outer sleeve between an outward first position and an inward second position, said plurality of collet segments being in the unlocked position when said outer sleeve is in said first position, said plurality of collet segments being in said locked position when said outer sleeve is in the second position, said locked position adapted to secure said body in connection with the hub.

2. The subsea connection system of claim 1, said outer sleeve having a surface on said inner wall thereof that bears against an outer surface of said plurality of collet segments as said outer sleeve moves between the first position and the second position.

3. The subsea connection system of claim 2, said surface on said inner wall of said outer sleeve having a first tapered region that bears against the outer surface of said plurality of collet segments when said outer sleeve is in the first position and said plurality of collet segments are in the unlocked position, said surface on said inner wall of said outer sleeve having a second tapered region that bears against said outer surface of said plurality of collet segments when said outer sleeve is in the second position and said plurality of collet segments are in the locked position.

4. The subsea connection system of claim 3, each of said plurality of collet segments having a first end and a second end, said first tapered region bearing against said first end of said plurality of collet segments when said plurality of collet segments are in the unlocked position, said second tapered region bearing against said second end of said plurality of collet segments when said plurality of collet segments are in the locked position.

5. The subsea connection system of claim 1, said plurality of collet segments having an end that extends outwardly beyond an end of said body, each of said plurality of collet segments having an inner shoulder at said end of said plurality of collet segments, said inner shoulder adapted to bear against the hub.

6. The subsea connection system of claim 1, said inner shoulder at said end of said plurality of collet segments being tapered so as to draw the hub toward an end of said body.

7. The subsea connection system of claim 1, said plurality of collet segments being pivotally mounted relative to said body.

8. The subsea connection system of claim 1, said translator comprising:
   a first hydraulic conduit formed through a wall of said sleeve, said first hydraulic conduit opening to said interior of said sleeve and to an exterior of said body.

9. The subsea connection system of claim 8, said translator further comprising:
   a shoulder formed on said exterior of said body; and
   a flange formed inwardly of said inner wall of said sleeve, said first hydraulic conduit opening to said inner wall of said sleeve into a space between said shoulder of said body and said flange of said sleeve.

10. The subsea connection system of claim 9, said translator further comprising:
    a pump connected to said first hydraulic conduit so as to introduce hydraulic fluid under pressure into said space so as to move said outer sleeve between the first position and the second position.

11. The subsea connection system of claim 10, said translator further comprising:
    a second hydraulic conduit formed through said wall of said sleeve in spaced relation to said first hydraulic conduit; and
    an annular fluid-receiving space formed in said interior of said sleeve on an opposite side of said flange from said shoulder, said pump adapted to introduce hydraulic fluid into said annular fluid-receiving space so as to move said sleeve from said second position to said first position.

12. The subsea connection system of claim 1, further comprising:
    a first poppet positioned in said interior passageway of said body adjacent said end of said body, said first poppet movable between an open position suitable for allowing the fluid to flow through said end of said body and a closed position suitable for blocking the fluid from flowing through said end of said body.

13. A subsea connection system comprising:
    a body having an interior passageway, said interior passageway adapted to allow a fluid to flow therethrough;
    a collet having a plurality of collet segments, said plurality of collet segments movable between a locked position and an unlocked position, said plurality of collet segments positioned adjacent to an end of said body;
    an outer sleeve overlying said collet, said outer sleeve having an inner wall and an interior;
    a translator cooperative with said outer sleeve so as to move said outer sleeve between an outward first position and an inward second position, said plurality of collet segments being in the unlocked position when said sleeve is in the first position, said plurality of collet segments being in said locked position when said outer sleeve is in the second position;
    a hub positioned adjacent said end of said body, said plurality of collet segments locking an end of said hub against said end of said body when said sleeve is in the second position and said plurality of collet segments are in the locked position; said hub having a flow passageway extending therethrough; and a first poppet positioned in said interior passageway of said body adjacent said end of said body, said first poppet movable between an open position suitable for allowing the fluid to flow through said end of said body and a closed position suitable for blocking the fluid from flowing through said end of said body; and a second poppet positioned in said flow passageway adjacent to an end of said hub, said second poppet movable between an open position suitable for allowing fluid to flow through said end of said hub and a closed position suitable for blocking fluid from flowing through said end of said hub, said first poppet having an end bearing against an end of said second poppet when said hub is locked by said plurality of collet segments to said body so as to maintain said first poppet in the open position and the second poppet in the open position, said first poppet being in the closed position and said second poppet being in said closed position when said sleeve is in the first position and said plurality of collet segments are in the unlocked position.

14. The subsea connection system of claim 13, said outer sleeve having a surface on said inner wall thereof that bears against an outer surface of said plurality of collet segments as said outer sleeve moves between the first position and the second position, said surface on said inner wall of said outer sleeve having a first tapered region that bears against the outer surface of said plurality of collet segments when said outer sleeve is in said first position and said plurality of collet segments are in the unlocked position, said surface on said inner wall of said outer sleeve having a second tapered region that bears against said outer surface of said plurality of collet segments when said outer sleeve is in said second position and said plurality of collet segments are in the locked position.

15. The subsea connection system of claim 13, said translator comprising:
    a first hydraulic conduit formed through a wall of said sleeve, said first hydraulic conduit opening to said interior of said sleeve and to an exterior of said body;
    a shoulder formed on said exterior of said body;
    a flange formed inwardly of said inner wall of said sleeve, said first hydraulic conduit opening at said inner wall of said sleeve into a space between said shoulder of said body and said flange of said sleeve; and
    a pump connected to said first hydraulic conduit so as to introduce hydraulic fluid under pressure into said space so as to move said outer sleeve between said first position and said second position.

16. A vertical connector for connecting to a hub in a subsea environment, said vertical connector comprising:
    a body having an interior passageway, said interior passageway adapted to allow a fluid to flow therethrough;
    a collet having a plurality of collet segments, said plurality of collet segments movable between a locked position and an unlocked position, said plurality of collet segments positioned adjacent to an end of said body;
    an outer sleeve overlying said collet, said outer sleeve having an inner wall and an interior, said outer sleeve having a hydraulic conduit formed through a wall thereof, said hydraulic conduit opening to said interior of said outer sleeve and to an exterior of said body, said outer sleeve having a surface on an interior thereof that cooperates with a surface on said exterior of said body so as to define a piston; and
    a pump cooperative with said outer sleeve so as to move said outer sleeve between an outward first position and an inward second position, said plurality of collet segments being in the unlocked position when said outer sleeve is in the first position, said plurality of collet segments being in the locked position when said outer sleeve is in the second position, said locked position adapted to secure said body in connection with the hub, said pump being connected to said hydraulic fluid conduit so as to introduce hydraulic fluid under pressure into said piston so as to move said outer sleeve between the first and second positions, said surface on said inner wall of said outer sleeve having a first tapered region that bears against the outer surface of said plurality of collet segments when said outer sleeve is in the first position and said plurality of collet segments are in the unlocked position, said surface on said inner wall of said outer sleeve having a second tapered region that bears against said outer surface of said plurality of collet segments when said outer sleeve is in the second position and said plurality of collet segments are in the locked position, each of said plurality of collet segments having a first end and a second end, said first tapered region bearing against said first end of said plurality of collet segments when said plurality of collet segments are in the unlocked position, said second tapered region bearing against said second end of said plurality of collet segments when said plurality of collet segments are in the locked position.

\* \* \* \* \*